T. H. RAGATZ.
DENTAL APPLIANCE.
APPLICATION FILED JAN. 29, 1916.
1,179,216.
Patented Apr. 11, 1916.
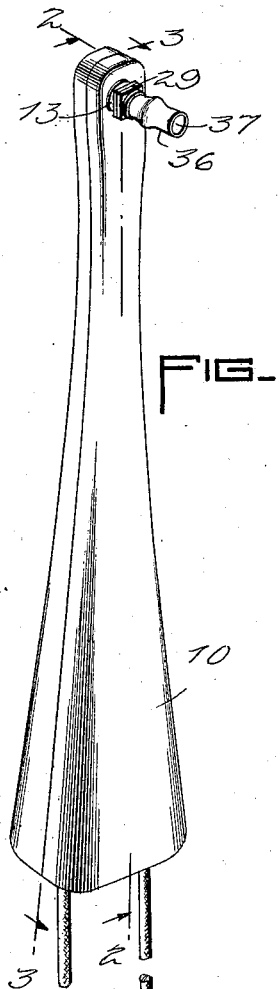
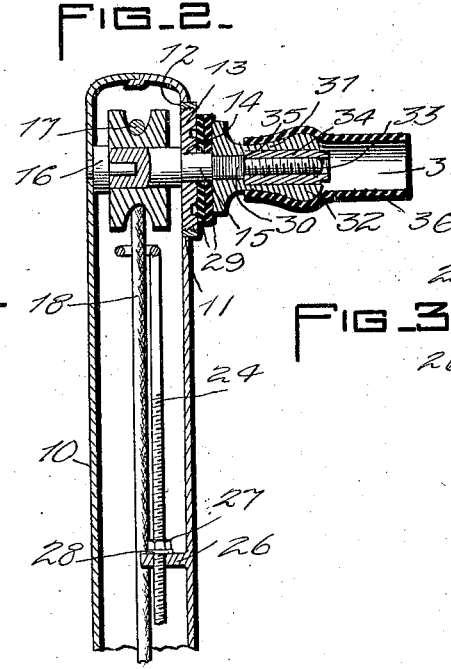
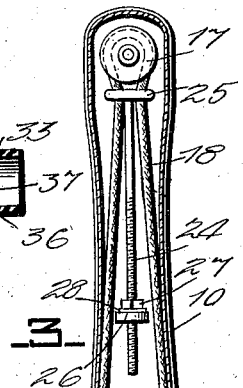
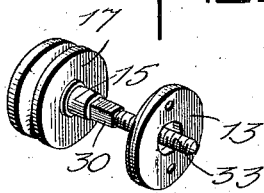
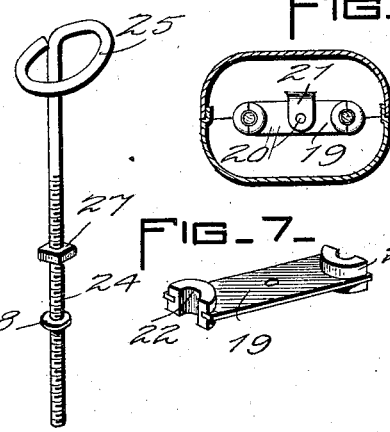
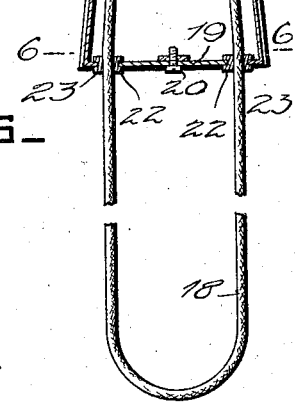
WITNESSES:
*J. Y. Phillips*
*H. E. Beck*
INVENTOR
THOMAS H. RAGATZ,
BY *Munn & Co*
ATTORNEYS
THE COLUMBIA PLANOGRAPH CO., WASHINGTON, D. C.

UNITED STATES PATENT OFFICE.

THOMAS H. RAGATZ, OF PRAIRIE DU SAC, WISCONSIN.

DENTAL APPLIANCE.

1,179,216.  Specification of Letters Patent.  Patented Apr. 11, 1916.

Application filed January 29, 1916. Serial No. 75,125.

*To all whom it may concern:*

Be it known that I, THOMAS H. RAGATZ, a citizen of the United States, and a resident of Prairie du Sac, in the county of Sauk and State of Wisconsin, have invented an Improvement in Dental Appliances, of which the following is a specification.

This invention is an improvement in dental appliances and has particular reference to a new and novel device for cleaning teeth.

An object of the invention is the provision of a rotary flexible container adapted to receive the cleaning material and to be placed over the tooth to be cleaned, said container being rotated by an endless flexible belt or cord.

Another object is to provide a tensioning device associated with said flexible element whereby to retain the same in operative relation with a pulley by tightening the same thereabout.

A further object is the provision of a mandrel which carries the flexible container and which has a mounting of novel construction so as to render the interior of the casing liquid tight whereby the end of the casing carrying said mandrel may be inserted in boiling water so as to sterilize the parts or immersed in an antiseptic solution.

A still further object is to provide a device of this character which is simple in construction, easy to manufacture, and effective in carrying out the purpose for which it is designed.

The inventive idea involved is capable of receiving a variety of mechanical expressions, one of which, for the purpose of illustrating the invention, is shown in the accompanying drawing, in which—

Figure 1 is a perspective view of the appliance constructed in accordance with the invention. Fig. 2 is a fragmentary section on the line 2—2 of Fig. 1. Fig. 3. is a section on the line 3—3 of Fig. 1. Fig. 4 is a detail perspective view of certain parts including the shaft supporting the mandrel. Fig. 5 is a similar view of the tensioning device used in connection with the invention. Fig. 6 is a section on the line 6—6 of Fig. 3. Fig. 7 is a perspective view of a detail.

Referring more particularly to the accompanying drawing, in which like reference characters indicate similar parts, the numeral 10 indicates a sectional casing preferably enlarged at its inner or handle end and tapered toward the other end thereof. One face of the casing adjacent the latter end thereof is provided with an enlarged opening 11 in which there is mounted an internally screw threaded ring 12 for receiving a bearing plate 13 provided with a central opening 14 for receiving the central portion of a shaft 15, the inner end of the shaft being mounted upon a suitable bearing 16 secured in the face of the casing opposite that in which the opening 11 is formed. The enlarged portion of the shaft 15 interiorly of the casing 10 has mounted thereon a pulley 17 over which an endless cord or belt 18 passes, the latter providing an operating device for rotating the shaft. The handle end of the casing 10 has detachably mounted therein a plate 19 secured in position by means of a small screw 20 engaging a lug 21 formed upon one of the sections of the casing. Each end of the plate 19 is provided with a portion of an eyelet device which coöperates with a complementary portion 23 carried by the casing to form suitable openings through which the flexible operating device 18 passes. This element 18 is of such length that the same may either be grasped and pulled to rotate the shaft 15 or may be connected with a suitable source of power such as a small motor or the like.

It is essential that sufficient friction between the pulley 17 and flexible element 18 exist so that when operating the latter the same will not slide over the member without rotating it. For this purpose the invention comprehends a tensioning device which consists of a threaded rod 24 having a ring 25 at one end thereof adapted to receive the element 18 therebetween, as best illustrated in Fig. 3. The rod 24 is mounted in a lug 26 formed interiorly of the casing and secured in position by a nut 27 threaded upon said rod and adapted to engage a flange 28 also on said rod, which flange rests upon the lug 26 whereby the tensioning device is supported in operative position. It will thus be seen that by adjusting the rod 24 back and forth the amount of friction between the pulley 17 and element 18 may be easily regulated.

In appliances of this nature it is often found desirable and necessary to sterilize the instrument by boiling or immerse the same in an antiseptic solution and in order to prevent any liquid from entering the casing with a resultant possibility of rusting certain of the parts the invention contemplates providing a pair of washers 29 mounted upon the shaft 15 exteriorly of the casing and adapted to engage the bearing plate 13. The shaft 15 is provided with a square portion 30 upon which is mounted the inner end of a mandrel 31 having an enlarged portion 32 at its outer end. The outer end of the shaft 15 is screw threaded as indicated at 33 to receive thereon an internally threaded fastening device 34 in the form of a sleeve, the central opening in the mandrel being enlarged sufficiently to receive said fastening device therein. The inner end of the fastening device 34 is adapted to engage an annular shoulder 35 formed at the inner end of the enlarged portion of the passage in the mandrel whereby a tightening of the fastening device will cause the inner end of the mandrel to securely engage the washers 29 and thus prevent any liquid from passing through the opening 14 in the bearing plate.

A flexible container 36 in the form of a short length of rubber tubing is mounted upon the mandrel 31 and retained in position thereon through the medium of the enlarged portion 32 which prevents said container from being accidentally detached from said mandrel. The container is of such a length as to provide a pocket 37 in its outer end adapted to contain the material with which the tooth is to be cleaned. Thus by placing the container over the tooth and rotating the same, by means of the shaft 15, the cleaning operation is effectively performed.

What is claimed is:

1. A dental appliance for cleaning teeth comprising a tapering sectional casing, a shaft mounted in said casing and having a mandrel at one end thereof, a flexible container carried by said mandrel, a pulley mounted upon said shaft, and a flexible cord mounted upon said pulley and extending longitudinally of said casing and projecting through one end thereof for operating said pulley to rotate said container.

2. A dental appliance for cleaning teeth including a flexible container, means including a flexible element for rotating the same, and a tensioning device including an adjustable rod having a loop at one end for receiving said flexible element to regulate the operation thereof.

3. A dental appliance comprising a casing having a detachable bearing plate mounted in one end, a shaft having a bearing in said plate, a mandrel mounted upon said shaft, washers interposed between the inner end of said mandrel and said bearing plate, a fastening device mounted upon said shaft and having a portion projecting into said mandrel and engaging the same whereby to tightly bind the mandrel against said washers, a flexible container mounted upon said mandrel, and means for rotating said shaft.

4. A dental appliance comprising a casing having a detachable bearing plate mounted in one end, a shaft having a bearing in said plate, a mandrel mounted upon said shaft, washers interposed between the inner end of said mandrel and said bearing plate, a fastening device mounted upon said shaft and having a portion projecting into said mandrel and engaging the same whereby to tightly bind the mandrel against said washers, a flexible container mounted upon said mandrel, an endless flexible element for rotating said shaft, and a tensioning device interiorly of the casing and engaging said flexible element.

5. A dental appliance comprising a casing, an operating shaft mounted therein and having a portion extending exteriorly thereof, a mandrel mounted upon the exterior portion of said shaft, means interposed between said mandrel and casing for excluding moisture from the latter, means extending into the mandrel for securing the last-named means in position, and a flexible container mounted upon said mandrel.

6. A dental appliance comprising a casing, a rotatable shaft mounted therein, a mandrel mounted upon said shaft, washers interposed between the inner end of said mandrel and said casing, a fastening device mounted upon said shaft and having a portion projecting into said mandrel and engaging the same whereby to tightly bind the mandrel against said washers, and a flexible container mounted upon said mandrel.

7. A dental appliance comprising a casing, a rotatable shaft having a bearing therein, a mandrel upon said shaft, sealing means interposed between the mandrel and said casing, and a fastening device projecting into said mandrel and engaging the same whereby to compress said sealing means.

8. A dental appliance comprising a casing having openings in one end thereof, a shaft mounted in said casing, a mandrel upon said shaft, a flexible element for rotating said shaft extending longitudinally of said casing and projecting through the openings in the end thereof, and a flexible container mounted upon said mandrel.

THOMAS H. RAGATZ.

In presence of—
  M. SCHREIBER,
  M. A. REYNOLDS.